US006775769B1

United States Patent
Inada et al.

(10) Patent No.: US 6,775,769 B1
(45) Date of Patent: Aug. 10, 2004

(54) CRYPTOGRAPHIC APPARATUS, ENCRYPTOR, AND DECRYPTOR

(75) Inventors: Toru Inada, Tokyo (JP); Shinobu Ushirozawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 889 days.

(21) Appl. No.: 09/644,812

(22) Filed: Aug. 24, 2000

(30) Foreign Application Priority Data

Nov. 26, 1999  (JP) ............................................ 11-335779

(51) Int. Cl.[7] ................................................ H04L 9/00
(52) U.S. Cl. ........................ 713/153; 713/152; 713/162
(58) Field of Search ................................ 713/153, 152, 713/162

(56) References Cited

U.S. PATENT DOCUMENTS

| 4,918,728 | A | * | 4/1990 | Matyas et al. | 380/280 |
| 5,086,469 | A | * | 2/1992 | Gupta et al. | 713/160 |
| 5,386,471 | A | * | 1/1995 | Bianco | 713/162 |
| 5,548,646 | A | * | 8/1996 | Aziz et al. | 713/153 |
| 5,548,649 | A | * | 8/1996 | Jacobson | 713/153 |
| 5,583,940 | A | | 12/1996 | Vidrascu et al. | |
| 6,016,350 | A | * | 1/2000 | Funabe et al. | 713/153 |

FOREIGN PATENT DOCUMENTS

| JP | 669962 | 3/1994 |
| JP | 9252315 | 9/1997 |
| JP | A1023076 | 1/1998 |
| JP | 10-271167 A | 10/1998 |
| WO | WO9832065 | 7/1998 |

OTHER PUBLICATIONS

Chieko Funabe et al., "Encryption Method for IPX protocol," The Institute of Electronics, Information and Communication Engineers, IEICE Technical Report, vol. 97, No. 131, Jun. 23, 1997, pp. 7–12.
Technical Report of IEICE, SSE97–21, RCS97–16 (Jun. 1997), Encryption Method for IPX Protocol by Funabe et al.

* cited by examiner

*Primary Examiner*—Ayaz Sheikh
*Assistant Examiner*—Ali M. Mashaal
(74) *Attorney, Agent, or Firm*—Birch, Stewart, Kolasch & Birch, LLP

(57) ABSTRACT

A cryptographic apparatus has an encryption/encapsulation processing section for encrypting plaintext data received from a plaintext network, referencing the predetermined correspondence between addresses and different cryptographic apparatus, setting a new header based on the cryptographic apparatus corresponding to the address set in the header of the plaintext data as encapsulation processing, and transmitting ciphertext data provided thereby to the ciphertext network of the same IP subnet as the plaintext network, and a decryption/decapsulation processing section for decrypting ciphertext data received from the ciphertext network into plaintext data, again setting a header based on the address set in the header of the plaintext data as decapsulation processing, and transmitting plaintext data provided thereby to the plaintext network of the same IP subnet as the ciphertext network.

4 Claims, 9 Drawing Sheets

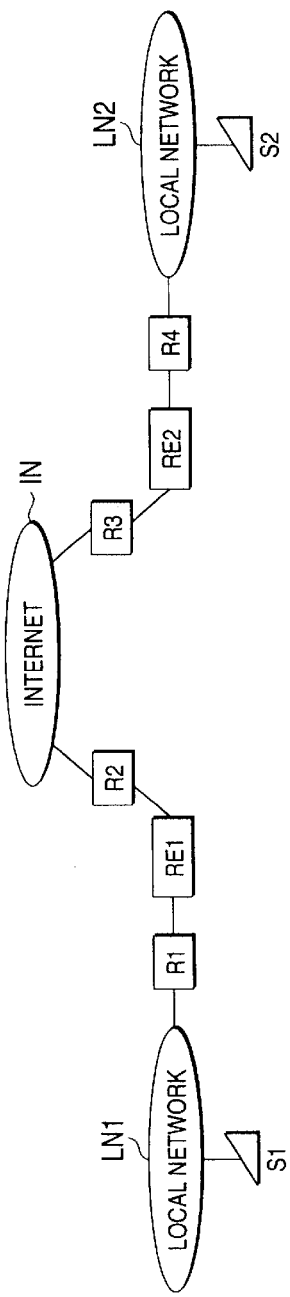
FIG. 2
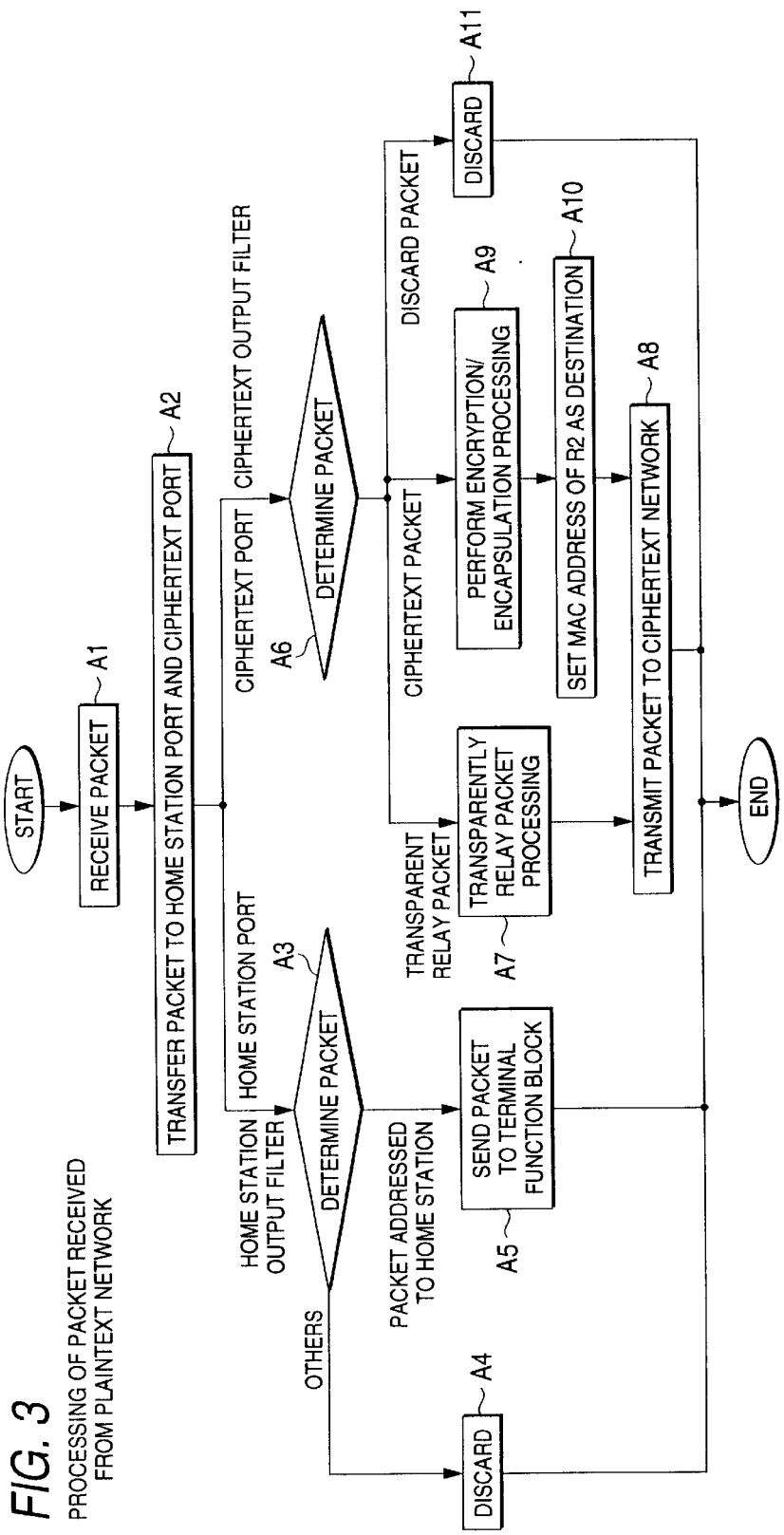
FIG. 3 PROCESSING OF PACKET RECEIVED FROM PLAINTEXT NETWORK

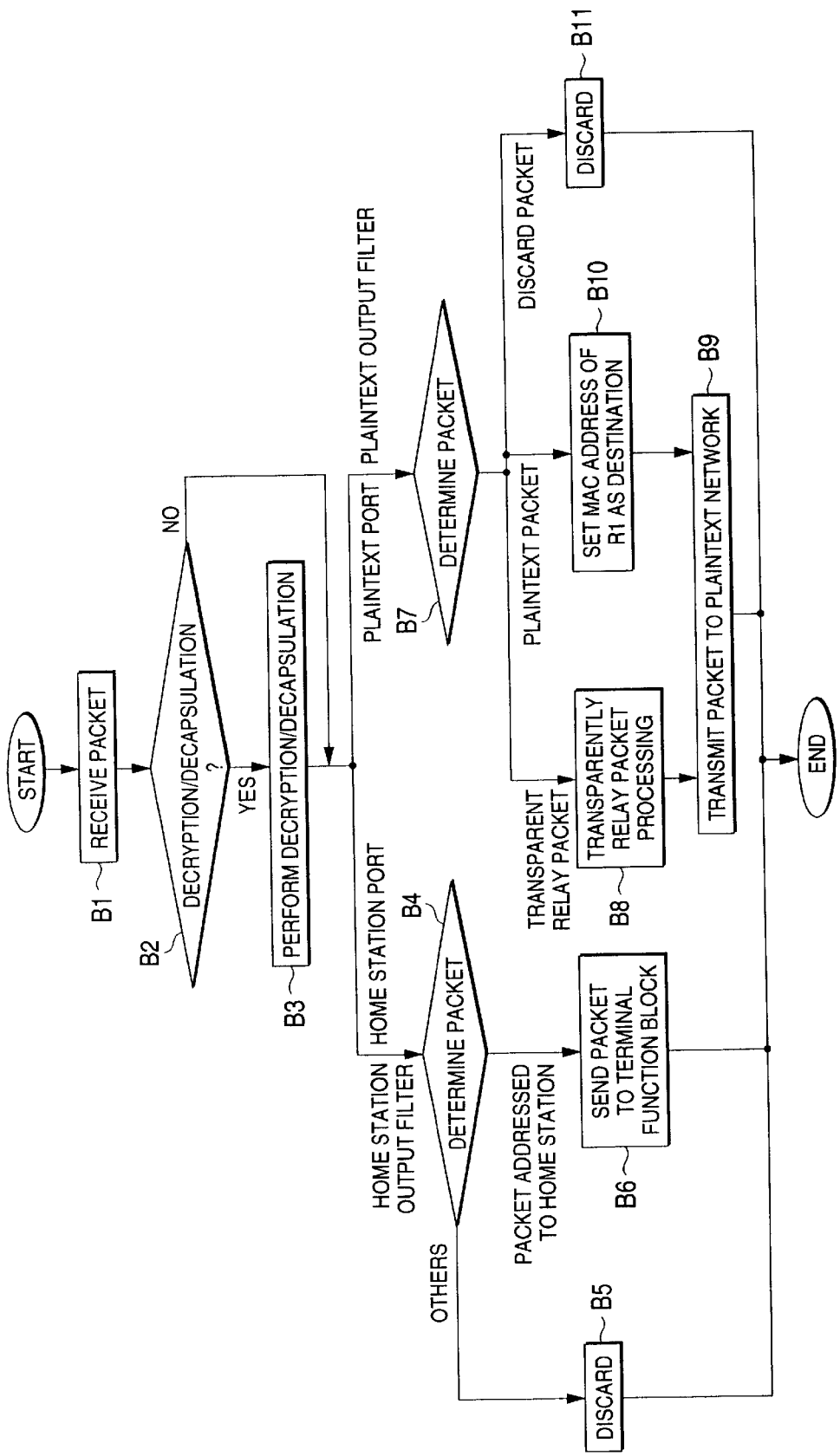

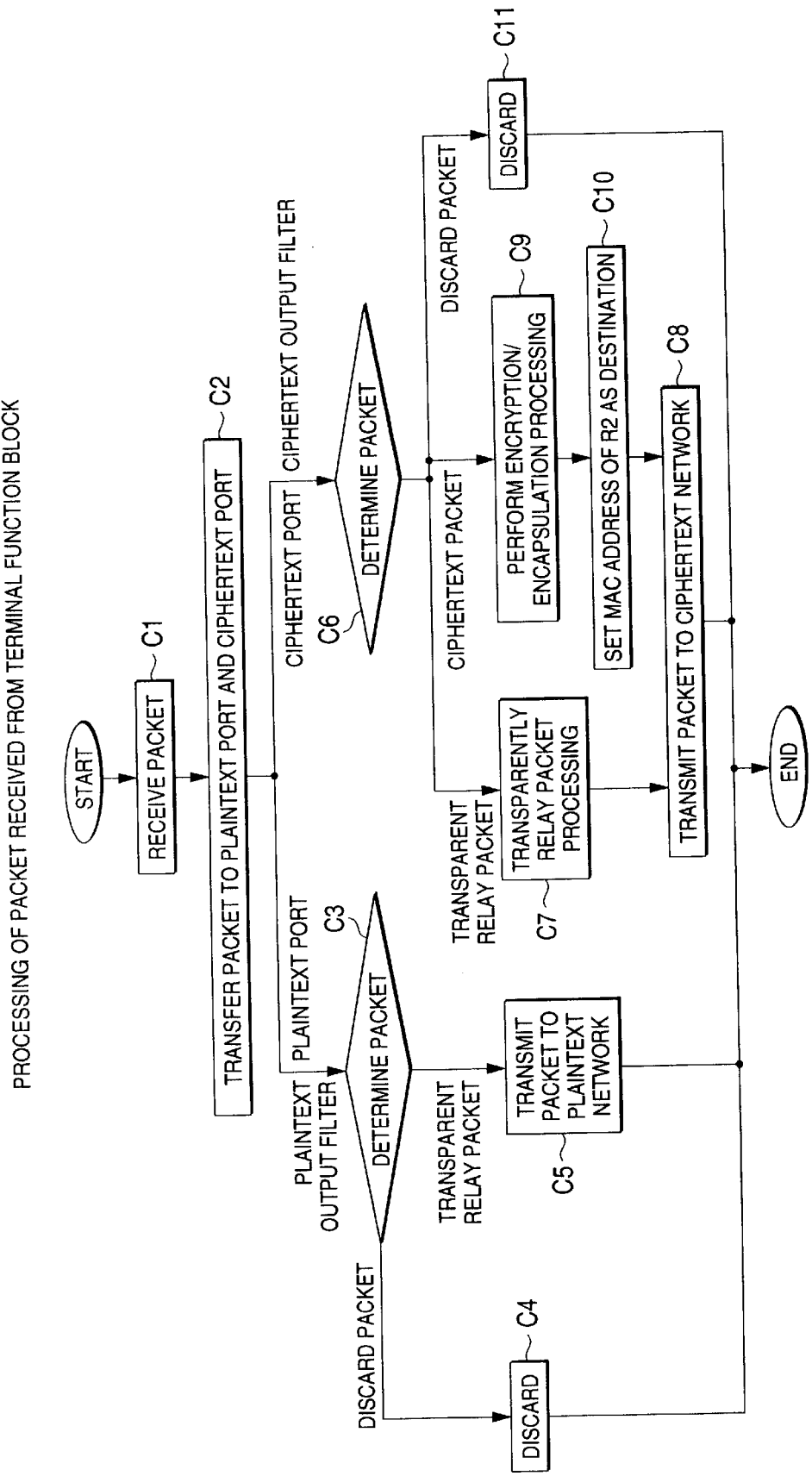

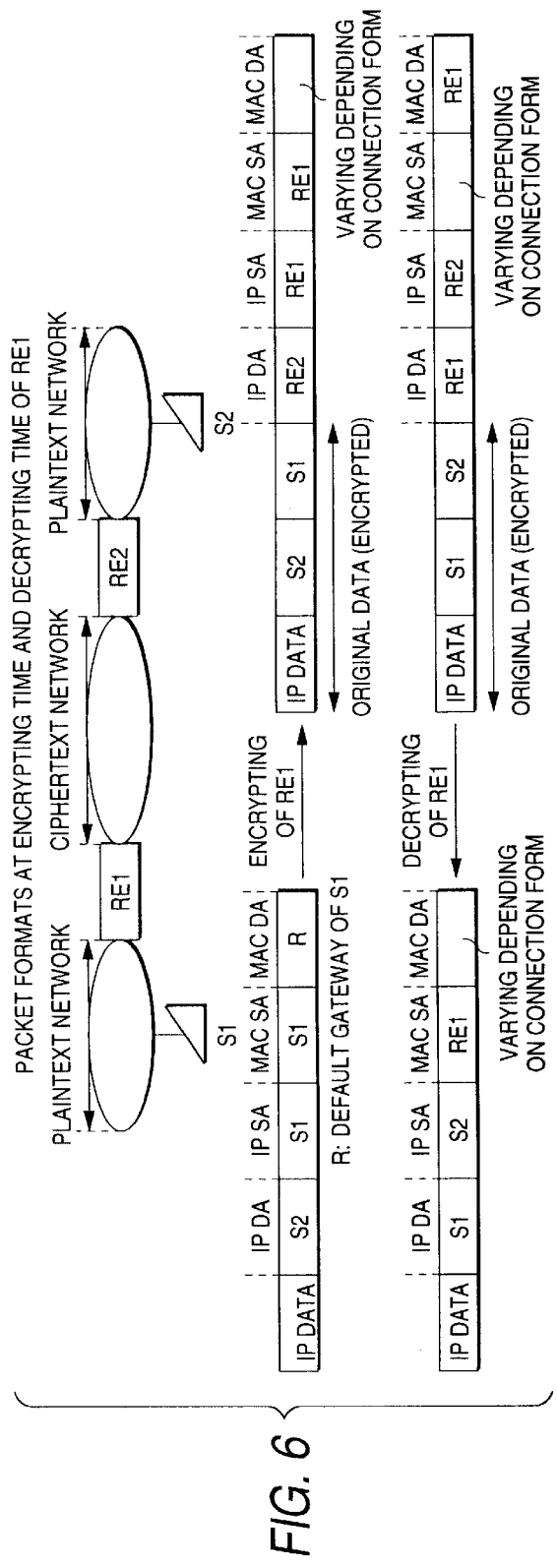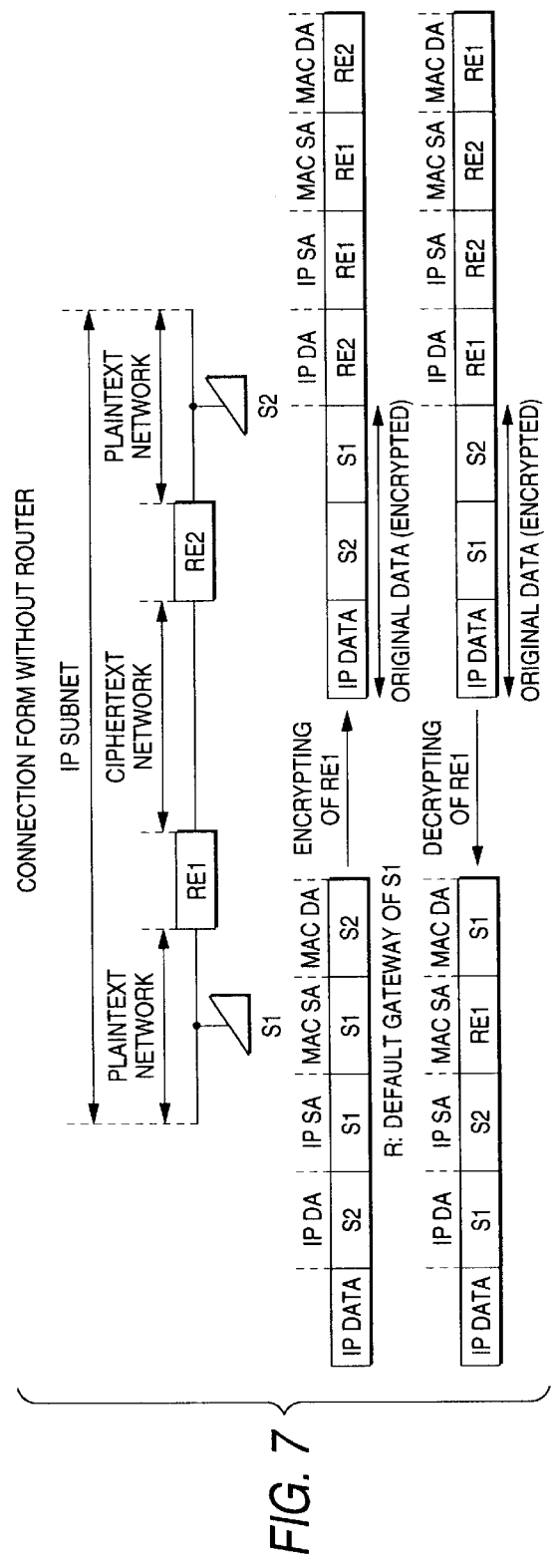

EXAMPLE OF ROUTER-TYPE CRYPTGRAPHIC APPARATUS

EXAMPLE OF TERMINAL-TYPE CRYPTGRAPHIC APPARATUS

CRYPTOGRAPHIC APPARATUS, ENCRYPTOR, AND DECRYPTOR

BACKGROUND OF THE INVENTION

1. Field of the Invention

This invention relates to an apparatus for relaying data between a plaintext network and a ciphertext network and in particular to a cryptographic apparatus for encrypting plaintext data and decrypting ciphertext data, an encryptor for encrypting plaintext data, and a decryptor for decrypting ciphertext data.

2. Description of the Related Art

A basic architecture of a cryptographic apparatus using an encapsulation encryption technique typified by IPSEC (RFC2401-RFC2410) on a network assumes a router or a terminal. FIG. 12 is a block diagram to show a general network configuration in a related art. An example in which cryptographic apparatus each adopting a router or a terminal as a basic architecture are installed in the network shown in FIG. 12 for constructing a cipher communication system will be discussed.

In FIG. 12, S1 denotes a terminal connected to a local network LN1, S2 denotes a terminal connected to a local network LN2, R1 denotes a router for connecting the local network LN1 and the Internet IN, and R2 denotes a router for connecting the local network LN2 and the Internet IN; the terminals S1 and S2 communicate with each other through the Internet IN. Generally, a fire wall function of a filter, etc., often works in the routers R1 and R2 connected to the Internet IN. Generally, the local networks LN1 and LN2 contain a plurality of routers forming a part of the local network.

FIG. 13 is a block diagram to show the network configuration wherein cryptographic apparatus each adopting a router as a basic architecture, which will be hereinafter referred to as a router-type cryptographic apparatus, are installed in the network shown in FIG. 12. In FIG. 13, ROE1 denotes a router-type cryptographic apparatus in the local network LN1, ROE2 denotes a router-type cryptographic apparatus in the local network LN2,SN1 denotes a newly defined subnet to install the router-type cryptographic apparatus ROE1, SN2 denotes a newly defined subnet to install the router-type cryptographic apparatus ROE2, and internet VPN is a VPN (Virtual Private Network) on the Internet that can be configured by installing the router-type cryptographic apparatus ROE1 and the router-type cryptographic apparatus ROE2. A communication data flow from the local network LN1 to the LN2 is indicated by the heavy line arrow (plaintext is indicated by the solid line part and ciphertext is indicated by the dotted line part).

However, as shown in FIG. 13, to install the routertype cryptographic apparatus ROE1 in the local network LN1, the router of the router-type cryptographic apparatus ROE1 is newly installed in the local network LN1 and thus setting the network parameters of the terminals and the routers in the local network LN1 needs to be changed so as to match additional. installation of the router-type cryptographic apparatus ROE1. Similar change needs also to be made in the local network LN2 in which the router-type cryptographic apparatus ROE2 is installed.

FIG. 14 is a block diagram to show the network configuration wherein cryptographic apparatus each adopting a terminal as a basic architecture, which will be hereinafter referred to as terminal-type cryptographic apparatus, are installed in the network shown in FIG. 12. In FIG. 14, SE1 denotes a terminal-type cryptographic apparatus in the local network LN1, SE2 denotes a terminal-type cryptographic apparatus in the local network LN2, and internet VPN is a VPN on the Internet that can be configured by installing the terminal-type cryptographic apparatus SE1 and the terminal-type cryptographic apparatus SE2. A communication data flow from the local network LN1 to the LN2 is indicated by the heavy line arrow (plaintext is indicated by the solid line part and ciphertext is indicated by the dotted line part)

However, as shown in FIG. 14, to install the terminal-type cryptographic apparatus SE1 in the local network LN1, setting the network parameters of the terminals and the routers in the local network LN1 needs to be changed so that communication data from the local network LN1 is destined for the terminal-type cryptographic apparatus SE1. Similar change needs also to be made in the local network LN2 in which the terminal-type cryptographic apparatus SE2 is installed.

Thus, to install a new cryptographic apparatus using the encapsulation encryption technique in the network in the related art, it is necessary to change setting the network parameters of the terminals and the routers in the local network connected to the cryptographic apparatus; this is a problem.

SUMMARY OF THE INVENTION

It is therefore an object of the invention to provide a cryptographic apparatus, an encryptor, and a decryptor which eliminate the need for changing the network parameters of other machines on a network when the cryptographic apparatus is installed, and can be easily installed in an existing network system.

According to an aspect of the invention, there is provided a cryptographic apparatus for relaying data between a plaintext network and a ciphertext network, the cryptographic apparatus comprising an encryption/encapsulation processing section for encrypting plaintext data received from the plaintext network, determining a cryptographic apparatus corresponding to the address set in the header of the plaintext data based on the predetermined correspondence between addresses and different cryptographic apparatus, setting a new header based on the determined cryptographic apparatus as encapsulation processing, and transmitting ciphertext data provided thereby to the ciphertext network of the same IP (Internet Protocol) subnet as the plaintext network, and a decryption/decapsulation processing section for decrypting ciphertext data received from the ciphertext network into plaintext data, again setting a header based on the address set in the header of the plaintext data as decapsulation processing, and transmitting plaintext data provided thereby to the plaintext network of the same IP subnet as the ciphertext network.

In the cryptographic apparatus according to the invention, the encryption/encapsulation processing section comprises an encryption/encapsulation processing block for encrypting plaintext data received from the plaintext network and determining the cryptographic apparatus corresponding to the address set in the IP (Internet Protocol) header of the plaintext data based on the predetermined correspondence between addresses and different cryptographic apparatus, and setting a new IP header based on the determined cryptographic apparatus as encapsulation processing, and a ciphertext MAC address resolution block for setting a MAC header based on the IP header set in the encryption/encapsulation processing block, preparing ciphertext data, and transmitting the prepared ciphertext data to the ciphertext network of the same IP subnet as the plaintext network, and the decryption/decapsulation processing section comprises a decryption/decapsulation processing block for decrypting ciphertext data received from the ciphertext network into plaintext data and again setting an IP header based on the address set in the IP header of the plaintext data as decapsulation processing, and a plaintext MAC address resolution block for setting a MAC header based on the IP header again set in the decryption/decapsulation processing block, preparing plaintext data, and transmitting the prepared plaintext data to the plaintext network of the same IP subnet as the ciphertext network.

The cryptographic apparatus according to the invention further includes a plaintext filter for determining the ciphertext data received from the ciphertext network to be transparent relay information, discard information, or plaintext information based on the decryption result of the decryption/decapsulation processing block and allowing the ciphertext data to be transmitted to the plaintext network if the ciphertext data is transparent relay information, discarding the ciphertext data if the ciphertext data is discard information, or outputting plaintext data decrypted by the decryption/decapsulation processing block to the plaintext MAC address resolution block if the ciphertext data is plaintext information, wherein the plaintext MAC address resolution block sets a MAC header in the plaintext data output from the plaintext filter and transmits the plaintext data to the plaintext network.

The cryptographic apparatus according to the invention further includes a ciphertext filter for determining the plaintext data received from the plaintext network to be transparent relay information, discard information, or ciphertext information and allowing the plaintext data to be transmitted to the ciphertext network if the plaintext data is transparent relay information, discarding the plaintext data if the plaintext data is discard information, or outputting the plaintext data to the decryption/decapsulation processing section if the plaintext data is ciphertext information, wherein the encryption/encapsulation processing section prepares ciphertext data from the plaintext data output from the ciphertext filter and transmits the ciphertext data to the ciphertext network.

The cryptographic apparatus according to the invention further includes a terminal function block for processing information addressed to the home station, transmitted to the home station, a plaintext home station filter for determining whether the plaintext data received from the plaintext network is information addressed to the home station or discard information and outputting the plaintext data to the terminal function block if the plaintext data is information addressed to the home station or discarding the plaintext data or ciphertext data if the plaintext data is discard information, a ciphertext home station filter for determining whether the ciphertext data received from the ciphertext network is information addressed to the home station or discard information and outputting the ciphertext data to the terminal function block if the ciphertext data is information addressed to the home station or discarding the ciphertext data if the ciphertext data is discard information, a home station plaintext filter for determining whether or not home station output information output from the terminal function block is transparent relay information to the plaintext network and allowing the home station output information to be transmitted to the plaintext network if the home station output information is transparent relay information to the plaintext network, a home station ciphertext filter for determining whether or not the home station output information output from the terminal function block is ciphertext information to the ciphertext network and outputting the home station output information to the decryption/decapsulation processing section if the home station output information is ciphertext information to the ciphertext network, and a home station discard filter for determining whether or not the home station output information output from the terminal function block is discard information and discarding the home station output information if the home station output information is discard information.

According to another aspect of the invention, there is provided an encryptor for relaying data between a plaintext network and a ciphertext network, the encryptor comprising an encryption/encapsulation processing section for encrypting plaintext data received from the plaintext network, determining a cryptographic apparatus corresponding to the address set in the header of the plaintext data based on the predetermined correspondence between addresses and different cryptographic apparatus, setting a new header based on the determined cryptographic apparatus as encapsulation processing, and transmitting ciphertext data provided thereby to the ciphertext network of the same IP subnet as the plaintext network.

According to another aspect of the invention, there is provided a decryptor for relaying data between a plaintext network and a ciphertext network, the decryptor comprising a decryption/decapsulation processing section for decrypting ciphertext data received from the ciphertext network into plaintext data, again setting a header based on the address set in the header of the plaintext data as decapsulation processing, and transmitting plaintext data provided thereby to the plaintext network of the same IP subnet as the ciphertext network.

BRIEF DESCRIPTION OF THE DRAWINGS

FIG. 2 is a block diagram to show the configuration of a network introducing the repeater-type cryptographic apparatus.

FIG. 3 is a flowchart to show an operation flow when a packet is received from a plaintext network.

FIG. 4 is a flowchart to show an operation flow when a packet is received from a ciphertext network.

FIG. 5 is a flowchart to show an operation flow when a repeater function block receives a packet from a terminal function block.

FIG. 6 is a schematic representation to describe setting of a MAC header and an IP header.

FIG. 7 is a schematic representation to describe setting of a MAC header and an IP header.

DETAILED DESCRIPTION OF THE PRESENT INVENTION

Referring now to the accompanying drawings, there is shown an embodiment of a cryptographic apparatus of the invention.

First Embodiment

Figure 1:
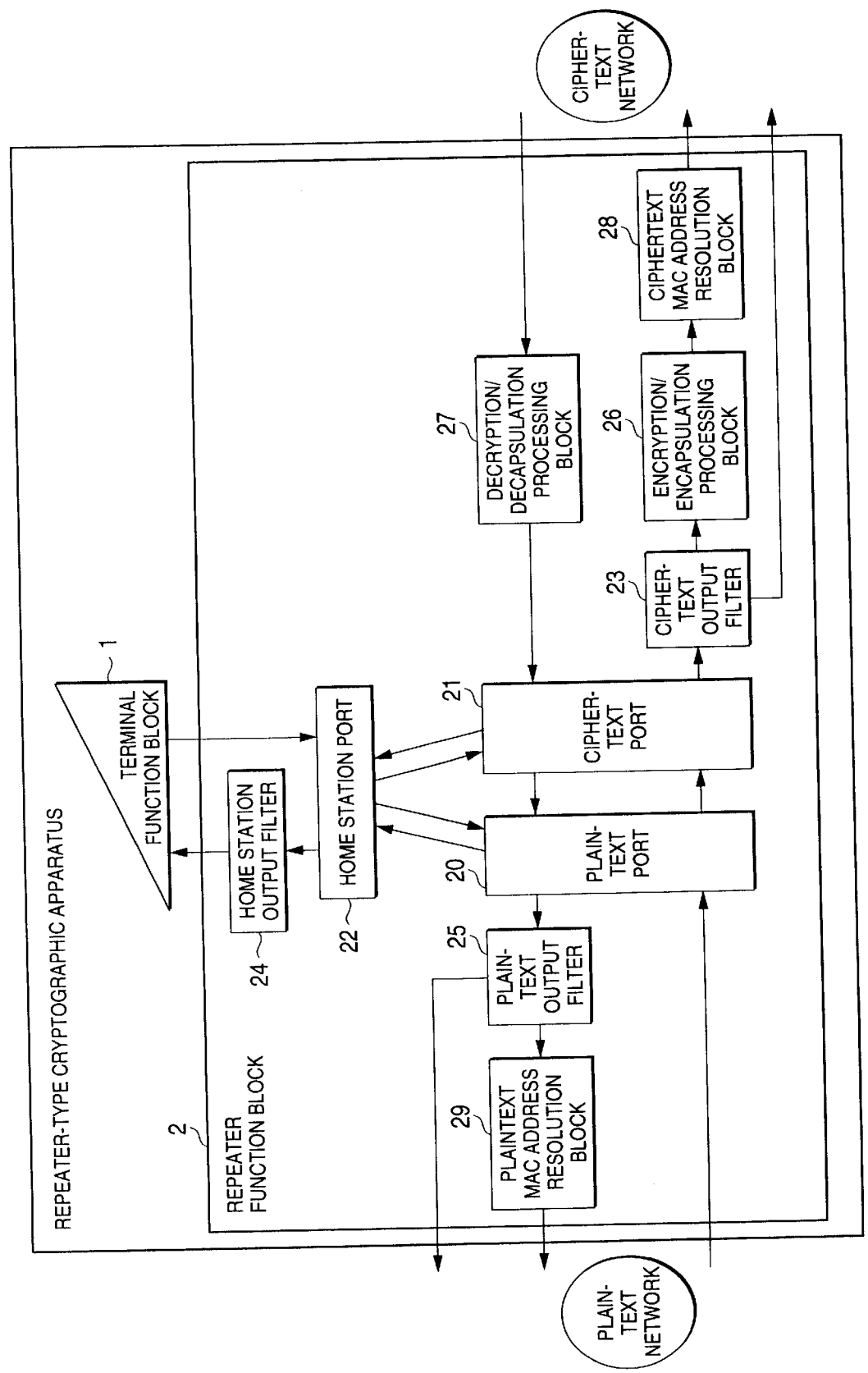
FIG. 1 is a block diagram to show the configuration of a cryptographic apparatus of a first embodiment of the invention.

FIG. 1 is a block diagram to show the function block configuration of a cryptographic apparatus of a first embodiment of the invention adopting a repeater that can be installed without changing the network parameters of existing machines on a network as a basic architecture, which will be hereinafter referred to as repeater-type cryptographic apparatus.

In FIG. 1, a terminal function block 1 is a function block for processing information addressed to the home station, transmitted to the repeater-type cryptographic apparatus, here, a packet addressed to the home station, transmitted as a packet, for example, a management packet for managing the repeater-type cryptographic apparatus, or the like; it has a similar function to that of a general terminal connected to a network and having an IP (Internet Protocol) connection function.

A repeater function block 2 has a function of encrypting and decrypting data without changing the network parameters of existing machines on the network like a repeater, which will be hereinafter referred to as repeater function.

A plaintext port 20 is an internal logical port positioned on the side of a plaintext network for transferring plaintext data received from the plaintext network, here, a plaintext packet transmitted as a packet to a ciphertext port 21 and a home station port 22 (described later) and outputting data transferred from the ciphertext port 21 or the home station port 22, here, a packet to a plaintext output filter 25 (described later).

The ciphertext port 21 is an internal logical port positioned on the side of a ciphertext network for transferring ciphertext data received from the ciphertext network, here, a ciphertext packet transmitted as a packet to the plaintext port 20 and the home station port 22 and outputting data transferred from the plaintext port 20 or the home station port 22, here, a packet to a ciphertext output filter 23 (described later).

The home station port 22 is an internal logical port positioned in the terminal function block for transferring home station output information output from the terminal function block 1, here, a packet to the plaintext port 20 and the ciphertext port 21 and outputting a packet transferred from the plaintext port 20 or the ciphertext port 21 to a home station output filter 24.

The ciphertext output filter 23 is a filter for a packet transferred to the ciphertext port 21 for determining the packet to be a discard packet which need not be transmitted from the ciphertext port 21, a transparent relay packet not processed and transparently relayed to the ciphertext network, or a ciphertext packet which needs to undergo encryption processing and discarding the packet if the packet is a discard packet, transmitting the packet to the ciphertext network if the packet is a transparent relay packet, or outputting the packet to an encryption/encapsulation processing block 26 (described later) if the packet is a ciphertext packet.

That is, the ciphertext output filter 23 consists of a ciphertext filter for determining plaintext data received from the plaintext network to be transparent relay information, discard information, or cipher information and transmitting the plaintext data to the plaintext network if the plaintext data is transparent relay information, discarding the plaintext data if the plaintext data is discard information, or outputting the plaintext data to a decryption/decapsulation processing section if the plaintext data is cipher information, a home station ciphertext filter for determining whether or not the home station output information output from the terminal function block 1 is cipher information to the ciphertext network and outputting the home station output information to the decryption/decapsulation processing section if the home station output information is cipher information to the ciphertext network, and a home station discard filter for determining whether or not the home station output information output from the terminal function block 1 is discard information and discarding the home station output information if the home station output information is discard information; further if the home station output information is transparent relay information to the ciphertext network, the ciphertext output filter 23 allows the home station output information to be transmitted to the ciphertext network.

The home station output filter 24 is a filter for a packet transferred to the home station port 22 for determining whether the packet is a packet addressed to the home station, which needs to be transmitted (sent to the terminal function block 1) from the home station port 22 or a discard packet which need not to be transmitted and transmitting the packet to the terminal function block 1 if the packet is a packet addressed to the home station or discarding the packet if the packet is a discard packet.

That is, the home station output filter 24 consists of a plaintext home station filter for determining whether the plaintext data received from the plaintext network is information addressed to the home station or discard information and outputting the plaintext data to the terminal function block 1 if the plaintext data is information addressed to the home station or discarding the plaintext data or ciphertext data if the plaintext data is discard information and a ciphertext home station filter for determining whether the ciphertext data received from the ciphertext network is information addressed to the home station or discard information and outputting the ciphertext data to the terminal function block 1 if the ciphertext data is information addressed to the home station or discarding the ciphertext data if the ciphertext data is discard information.

The plaintext output filter 25 is a filter for a packet transferred to the plaintext port 20 for determining the packet to be a discard packet which need not be transmitted from the plaintext port 20, a transparent relay packet not processed and transparently relayed to the plaintext network, or a plaintext packet undergoing decryption and decapsulation processing performed by a decryption/decapsulation processing block 27 (described later) and discarding the packet if the packet is a discard packet, transmitting the packet to the plaintext network if the packet is a transparent relay packet, or outputting the packet to a plaintext MAC (Media Access Control) address resolution block 29 (described later) if the packet is a plaintext packet.

That is, the plaintext output filter 25 consists of a plaintext filter for determining the ciphertext data received from the ciphertext network to be transparent relay information, discard information, or plaintext information based on the decryption result of a decryption/decapsulation processing block 27 (described later) and allowing the ciphertext data to be transmitted to the plaintext network if the ciphertext data is transparent relay information, discarding the ciphertext data if the ciphertext data is discard information, or outputting plaintext data decrypted by the decryption/decapsulation processing block 27 to the plaintext MAC address resolution block 29 if the ciphertext data is plaintext information, a home station plaintext filter for determining whether or not the home station output information output from the terminal function block 1 is transparent relay information to the plaintext network and allowing the home station output information to be transmitted to the plaintext network if the home station output information is transparent relay information to the plaintext network, and a home station discard filter for determining whether or not the home station output information output from the terminal function block 1 is discard information and discarding the home station output information if the home station output information is discard information.

The encryption/encapsulation processing block 26 has functions of encrypting plaintext data received from the plaintext network, here a plaintext packet, and determining the cryptographic apparatus corresponding to the address set in an IP (Internet Protocol) header of the plaintext data based on the predetermined correspondence between addresses and different cryptographic apparatus and setting a new IP header based on the determined cryptographic apparatus as encapsulation processing.

The decryption/decapsulation processing block 27 has functions of decrypting ciphertext data received from the ciphertext network, here a ciphertext packet, into plaintext data and again setting an IP header based on the address set in the IP header of the plaintext data and further has the functions of determining whether or not decryption and decapsulation processing is required for the ciphertext packet and executing decryption and decapsulation processing if required or allowing the ciphertext packet to be transferred to the home station port 22 and the plaintext port 20 if not required and discarding the packet if an error occurs during the decryption and decapsulation processing or if decryption and decapsulation processing is not required and it is not necessary to transparently relaying the packet.

A ciphertext MAC address resolution block 28 has functions of setting a MAC header based on the IP header set in the encryption/encapsulation processing block 26, preparing ciphertext data, and transmitting the prepared ciphertext data to the ciphertext network of the same IP subnet as the plaintext network.

The plaintext MAC address resolution block 29 has functions of setting a MAC header based on the IP header again set in the decryption/decapsulation processing block 27, preparing plaintext data, and transmitting the prepared plaintext data to the plaintext network of the same IP subnet as the ciphertext network.

In the embodiment, the encryption/encapsulation processing block 26 and the ciphertext MAC address resolution block 28 make up an encryption/encapsulation processing section for encrypting plaintext data received from the plaintext network, determining the cryptographic apparatus corresponding to the address set in the header of the plaintext data based on the predetermined correspondence between addresses and different cryptographic apparatus, setting anew header based on the determined cryptographic apparatus as encapsulation processing, and transmitting the provided ciphertext data to the ciphertext network of the same IP subnet as the plaintext network.

The decryption/decapsulation processing block 27 and the plaintext MAC address resolution block 29 make up a decryption/decapsulation processing section for decrypting ciphertext data received from the ciphertext network into plaintext data, again setting a header based on the address set in the header of the plaintext data as decapsulation processing, and transmitting the provided plaintext data to the plaintext network of the same IP subnet as the ciphertext network.

FIG. 2 is a block diagram to show the configuration of a network introducing the repeater-type cryptographic apparatus shown in FIG. 1. In FIG. 2, LN1 and LN2 denote local networks corresponding to the plaintext networks in FIG. 1. S1 and S2 denote terminals belonging to the local networks LN1 and LN2. R1 and R4 denote routers in the local networks LN1 and LN2 and R2 and R3 denote connection routers to the Internet IN corresponding to the ciphertext network in FIG. 1. RE1 and RE2 denote repeater-type cryptographic apparatus.

Next, the operation of the repeater-type cryptographic apparatus shown in FIGS. 1 and 2 will be discussed focusing attention on the repeater-type cryptographic apparatus RE1 with reference to the accompanying drawings.

First, the operation of the repeater-type cryptographic apparatus which receives a packet from the plaintext network will be discussed. FIG. 3 is a flowchart to show an operation flow when a packet is received from the plaintext network.

When a packet is received from the plaintext network at step A1, the received packet is transferred through the plaintext port 20 to the home station port 22 and the ciphertext port 21 at step A2.

The packet transferred to the home station port 22 is output to the home station output filter 24, which then determines whether the packet is a packet addressed to the home station, which needs to be sent to the terminal function block 1 or a discard packet which need not be sent thereto at step A3. If the packet is a discard packet, it is discarded at step A4; if the packet is a packet addressed to the home station, it is a management packet containing information for managing the operation of the home station or the like and is sent to the terminal function block 1 at step A5.

The packet transferred to the ciphertext port 21 at step A2 is output to the ciphertext output filter 23, which then determines the packet to be a transparent relay packet not processed and transparently relayed to the ciphertext network, a ciphertext packet which needs to undergo encryption processing, or a discard packet which need not be transmitted from the ciphertext port 21 at step A6.

As a result of the determination, a transparent relay packet such as a network control packet is not processed in the repeater-type cryptographic apparatus and is relayed at step A7 and is transmitted to the ciphertext network at step A8.

A ciphertext packet is sent to the encryption/encapsulation processing block 26, which then performs encryption and encapsulation processing for the ciphertext packet at step A9. That is, the encryption/encapsulation processing block 26 encrypts the whole ciphertext packet and adds a new IP header. After the ciphertext packet undergoes the encryption and encapsulation processing, it is sent to the ciphertext MAC address resolution block 28 and a MAC address is set. Here, the MAC address of the router R2 is set at step A10 and the packet is transmitted to the ciphertext network at step A8. A MAC address resolution method in the MAC address resolution block will be discussed later.

A discard packet is discarded at step A11.

Next, the operation of the repeater-type cryptographic apparatus which receives a packet from the ciphertext network will be discussed. FIG. 4 is a flowchart to show an operation flow when a packet is received from the ciphertext network.

When a packet is received from the ciphertext network at step B1, the received packet is sent to the decryption/decapsulation processing block 27, which then determines whether or not decryption and decapsulation processing is required for the packet at step B2.

If decryption and decapsulation processing is required, the packet is decrypted and decapsulated at step B3 and is transferred through the ciphertext port 21 to the home station port 22 and the plaintext port 20. That is, the decryption/decapsulation processing block 27 removes the newly added IP header and MAC header on the cryptographic side (here, the repeater-type cryptographic apparatus RE2), decrypts the whole packet into a plaintext packet, and transfers the plaintext packet to the home station port 22 and the plaintext port 20.

If decryption and decapsulation processing is not required, the packet is transferred to the home station port 22 and the plaintext port 20 as it is (transparent relay). If an authentication error occurs in the decryption and decapsulation processing or the decryption and decapsulation processing is not required and transparent relay is not required either, the packet is discarded.

The packet transferred to the home station port 22 is output to the home station output filter 24, which then determines whether the packet is a packet addressed to the home station or a discard packet at step B4. If the packet is a discard packet, it is discarded at step B5; if the packet is a packet addressed to the home station, it is sent to the terminal function block 1 at step B6.

The packet transferred to the plaintext port 20 is output to the plaintext output filter 25, which then determines the packet to be a transparent relay packet not processed and transparently relayed to the plaintext network, a plaintext packet undergoing decryption and decapsulation processing by the decryption/decapsulation processing block 27, or a discard packet at step B7.

As a result of the determination, a transparent relay packet such as a network control packet is not processed in the repeater-type cryptographic apparatus and is relayed at step B8 and is transmitted to the plaintext network at step B9.

A plaintext packet is sent to the plaintext MAC address resolution block 29, which then sets the MAC address of the router R1 at step B10 and transmits the packet to the plaintext network at step B9. A MAC address resolution method in the MAC address resolution block will be discussed later.

A discard packet is discarded at step B11.

Next, the operation of the repeater-type cryptographic apparatus when the repeater function block 2 receives a packet from the terminal function block 1 will be discussed. FIG. 5 is a flowchart to show an operation flow when the repeater function block 2 receives a packet from the terminal function block 1.

When a packet is received from the terminal function block 1 at step C1, the received packet is transferred through the home station port 22 to the plaintext port 20 and the ciphertext port 21 at step C2.

The packet transferred to the plaintext port 20 is output to the plaintext output filter 25, which then determines whether the packet is a transparent relay packet or a discard packet at step C3. If the packet is a discard packet, it is discarded at step C4; if the packet is a transparent relay packet, it is transmitted to the plaintext network as it is at step B5.

The packet transferred to the ciphertext port 21 at step C2 is output to the ciphertext output filter 23, which then determines the packet to be a transparent relay packet, a ciphertext packet, or a discard packet at step C6. As a result of the determination, a transparent relay packet such as a network control packet is not processed in the repeater-type cryptographic apparatus and is relayed at step C7 and is transmitted to the ciphertext network at step C8.

A ciphertext packet is sent to the encryption/encapsulation processing block 26, which then performs encryption and encapsulation processing for the ciphertext packet at step C9. After the ciphertext packet undergoes the encryption and encapsulation processing, it is sent to the ciphertext MAC address resolution block 28, which then sets the MAC address of the router R2 at step C10 and transmits the packet to the ciphertext network at step C8. A MAC address resolution method in the MAC address resolution block will be discussed later.

A discard packet is discarded at step C11.

The MAC address resolution methods in the MAC address resolution blocks 28 and 29 will be discussed.

FIG. 6 is a schematic representation to describe setting of the MAC header and the IP header when a packet is encrypted (encapsulated) or decrypted (decapsulated) in the repeater-type cryptographic apparatus. As shown in FIG. 6, the IP address of the IP header can be determined uniquely independently of the connection form of the repeater-type cryptographic apparatus, however, for the MAC address of the MAC header, processing of setting an appropriate MAC address becomes necessary depending on the connection form of the repeater-type cryptographic apparatus, etc. The MAC address resolution blocks 28 and 29 execute the processing.

FIGS. 7 to 10 show the connection forms of the repeater-type cryptographic apparatus to be considered in the MAC address resolution logic. In the description to follow, attention is focused on RE1 in the figures.

FIG. 7 shows the connection form in which a router does not exist in the plaintext network to which the repeater-type cryptographic apparatus RE1 is connected or in the ciphertext network to which the repeater-type cryptographic apparatus RE1 is connected, namely, one IP subnet exists.

In the repeater-type cryptographic apparatus RE1 receiving a packet from the plaintext network, the encryption/encapsulation processing block 26 performs encryption and encapsulation processing for the packet. That is, it encrypts the whole of the received plaintext packet as original data and sets a new IP header.

Here, the encryption/encapsulation processing block 26 contains a correspondence table indicating the correspondence between IP addresses and cryptographic apparatus to encrypt or decrypt the packets in which the IP addresses are set and uses the correspondence table to set the cryptographic apparatus RE1, RE2 corresponding to the IP address of the terminal S1, S2 set in the IP address (IP DA and IP SA) of the IP header contained in the original data as the IP address of the new IP header.

Then the ciphertext MAC address resolution block 28 sets the MAC address of the MAC header based on the IP address of the IP header newly set. That is, the home MAC address (RE1 MAC address) is set in MAC SA based on RE1 set in IP SA. The MAC address of RE2 is acquired based on RE2 set in IP DA, for example, here, according to ARP (Address Resolution Protocol) and is set in MAC DA and a ciphertext packet is prepared. The ciphertext packet is transmitted to the ciphertext network.

The ARP is a protocol to find an Ethernet address from the IP address at the TCP/IP communication time and can be used to know the MAC address.

In the repeater-type cryptographic apparatus RE1 receiving a ciphertext packet from the ciphertext network, the decryption/decapsulation processing block 27 performs decryption and decapsulation processing for the ciphertext packet. That is, it removes the IP header and the MAC header newly added by another cryptographic apparatus on the cryptographic side and decrypts the received ciphertext data into the original data, whereby the IP address of the IP header is again set according to the original data.

Then, the plaintext MAC address resolution block 29 sets the MAC address of the MAC header. Here, the home MAC address (RE1 MAC address) is set in MAC SA. The MAC address of S1 is acquired based on S1 set in IP DA, for example, here, according to ARP and is set in MAC DA and a plaintext packet is prepared. The plaintext packet is transmitted to the plaintext network.

As the MAC address set in MAC SA, the MAC address of RE2 may be set based on MAC SA (RE2) set in the received packet.

Figure 8:
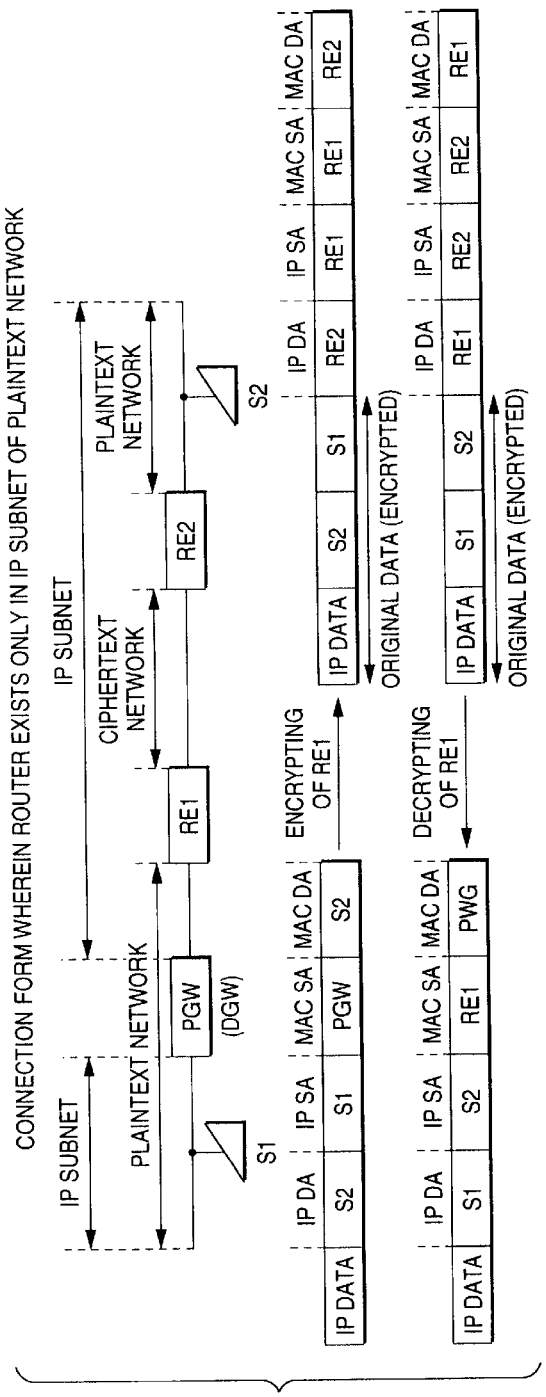
FIG. 8 is a schematic representation to describe setting of a MAC header and an IP header.

FIG. 8 shows the connection form in which one or more routers exist only in the IP subnet of the plaintext network to which the repeater-type cryptographic apparatus RE1 is connected. In the connection form, the repeater-type cryptographic apparatus RE1 registers one router in the IP subnet of the plaintext network as a plaintext gateway (PGW). The default gateway (DGW) set in the terminal function block 1 having a similar function to that of a general terminal in the repeater-type cryptographic apparatus may be the same router as the PGW or a different router. In FIG. 8, the PGW is set as the DGW in the terminal function block 1 because a router other than the PGW does not exist.

In the repeater-type cryptographic apparatus RE1 receiving a packet from the plaintext network, as in the connection form with no router shown in FIG. 7, the encryption/encapsulation processing block 26 encrypts the whole of the received plaintext packet as original data and uses the correspondence table to set a new IP header. Then, the ciphertext MAC address resolution block 28 sets the MAC address of the MAC header based on the IP address of the IP header newly set, prepares a ciphertext packet, and transmits the ciphertext packet to the ciphertext network.

In the repeater-type cryptographic apparatus RE1 receiving a ciphertext packet from the ciphertext network, the decryption/decapsulation processing block 27 performs decryption and decapsulation processing for the ciphertext packet, whereby the IP address of the IP header is again set according to the original data.

Then, the plaintext MAC address resolution block 29 sets the MAC address of the MAC header. Here, the home MAC address (RE1 MAC address) is set in MAC SA. The address of the terminal S1 as the destination is checked based on S1 set in IP DA to see if the terminal S1 exists in the same IP segment as the repeater-type cryptographic apparatus RE1 (IP subnet). If the terminal S1 exists in the same IP segment, the MAC address of the terminal S1 is acquired, for example, according to ARP and the S1 MAC address is set in MAC DA as in the connection form previously described with reference to FIG. 7. In the connection form in FIG. 8, the terminal S1 does not exist in the same IP segment as the repeater-type cryptographic apparatus RE1, thus the MAC address of PGW is acquired, for example, according to ARP and the PGW MAC address is set in MAC DA and a plaintext packet is prepared. The plaintext packet is transmitted to the plaintext network.

As the MAC address set in MAC SA, the MAC address of RE2 may be set based on MAC SA (RE2) set in the received packet.

Figure 9:
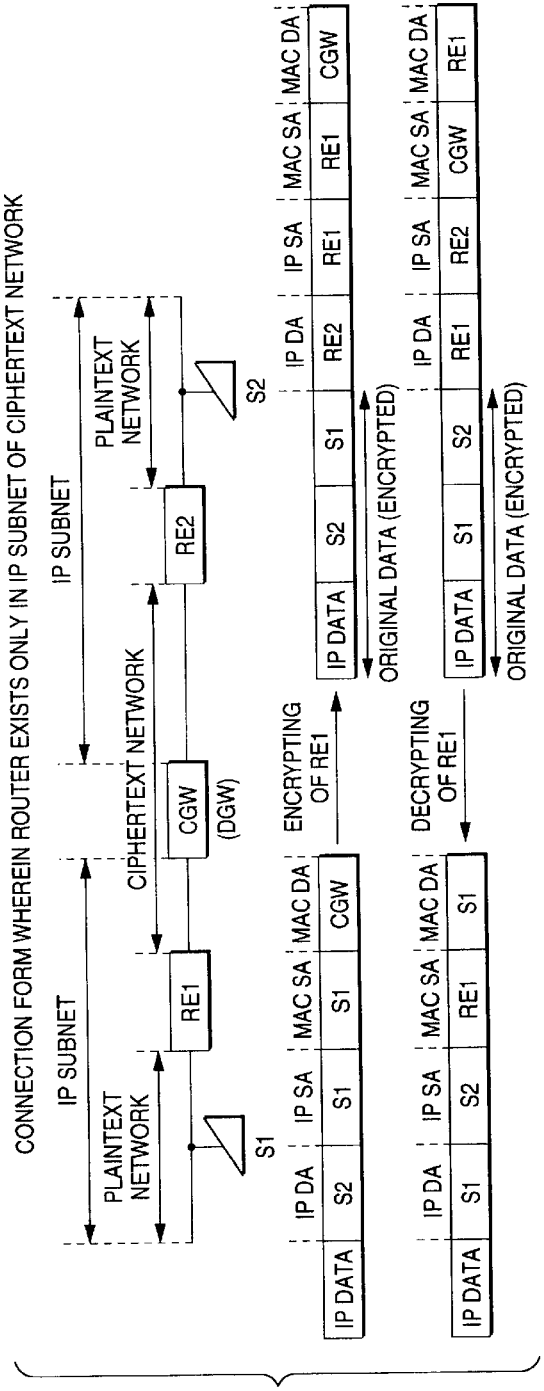
FIG. 9 is a schematic representation to describe setting of a MAC header and an IP header.

FIG. 9 shows the connection form in which one or more routers exist only in the IP subnet of the ciphertext network to which the repeater-type cryptographic apparatus RE1 is connected. In the connection form, the repeater-type cryptographic apparatus RE1 registers one router in the IP subnet of the ciphertext network as a ciphertext gateway (CGW). The default gateway (DGW) set in the terminal function block 1 having a similar function to that of a general terminal in the repeater-type cryptographic apparatus may be the same router as the CGW or a different router. In FIG. 9, the CGW is set as the DGW in the terminal function block 1 because a router other than the CGW does not exist.

In the repeater-type cryptographic apparatus RE1 receiving a plaintext packet from the plaintext network, as in the connection form with no router shown in FIG. 7, the encryption/encapsulation processing block 26 encrypts the whole of the received plaintext packet as original data and uses the correspondence table to set a new IP header. Then, the ciphertext MAC address resolution block 28 sets the MAC address of the MAC header based on the IP address of the IP header newly set, prepares a ciphertext packet, and transmits the ciphertext packet to the ciphertext network. That is, the home MAC address (MAC address of RE1) is set in MAC SA and the MAC address of the router CGW belonging to the same IP subnet as RE2 is acquired, for example, according to ARP and is set in MAC DA.

In the repeater-type cryptographic apparatus RE1 receiving a ciphertext packet from the ciphertext network, the decryption/encapsulation processing block 27 performs decryption and decapsulation processing for the ciphertext packet, whereby the IP address of the IP header is again set according to the original data.

Then, the plaintext MAC address resolution block 29 sets the MAC address of the MAC header. Here, the home MAC address (RE1 MAC address) is set in MAC SA. The MAC address of the terminal S1 is acquired based on S1 set in IP DA, for example, here, according to ARP and is set in MAC DA and a plaintext packet is prepared. The plaintext packet is transmitted to the plaintext network.

As the MAC address set in MAC SA, the MAC address of CGW may be set intact based on MAC SA (CGW) set in the received packet. The MAC address of CGW may be acquired, for example, according to ARP and set based on the router CGW belonging to the ciphertext subnet.

Figure 10:
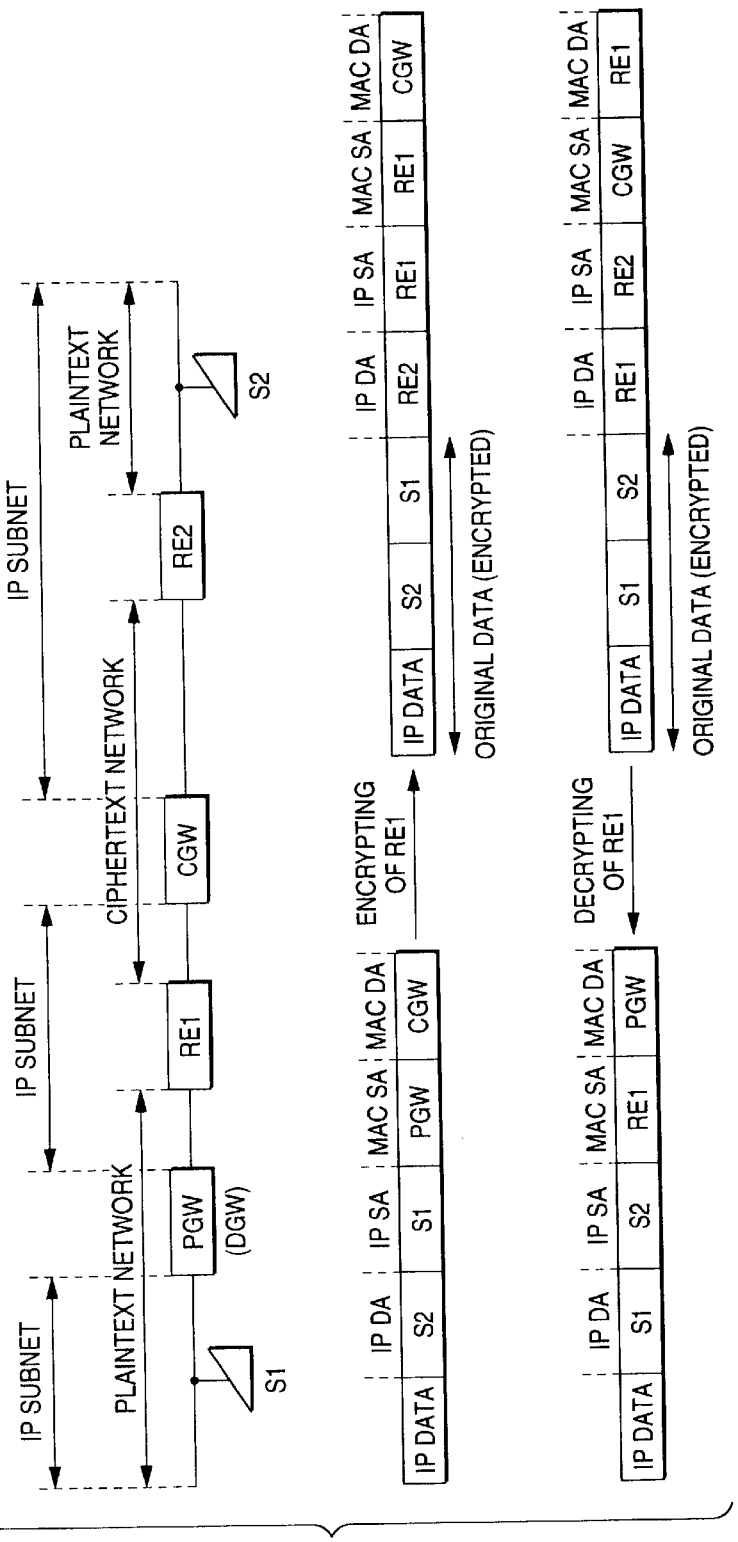
FIG. 10 is a schematic representation to describe setting of a MAC header and an IP header.

FIG. 10 shows the connection form in which one or more routers exist in the IP subnet of the plaintext network to which the repeater-type cryptographic apparatus RE1 is connected and exist in the IP subnet of the ciphertext network to which the repeater-type cryptographic apparatus RE1 is connected. In the connection form, DGW set in the terminal function block 1 may be a router belonging to either the plaintext subnet or the ciphertext subnet; generally, a router belonging to the plaintext subnet is set. In FIG. 10, PGW is set as the DGW in the terminal function block 1.

In the repeater-type cryptographic apparatus RE1 receiving a packet from the plaintext network, as in the connection form with no router shown in FIG. 7, the encryption/encapsulation processing block 26 encrypts the whole of the received plaintext packet as original data and uses the correspondence table to set a new IP header. Then, the ciphertext MAC address resolution block 28 sets the MAC address of the MAC header based on the IP address of the IP header newly set, prepares a ciphertext packet, and transmits the ciphertext packet to the ciphertext network. That is, the home MAC address (MAC address of RE1) is set in MAC SA and the MAC address of the router CGW belonging to the same IP subnet as RE2 is acquired, for example, according to ARP and is set in MAC DA.

In the repeater-type cryptographic apparatus RE1 receiving a ciphertext packet from the ciphertext network, the decryption/decapsulation processing block 27 performs decryption and decapsulation processing for the ciphertext packet, whereby the IP address of the IP header is again set according to the original data.

Then, the plaintext MAC address resolution block 29 sets the MAC address of the MAC header. Here, the home MAC address (RE1 MAC address) is set in MAC SA. The address of the terminal S1 as the destination is checked based on S1 set in IP DA to see if the terminal S1 exists in the same IP segment as the repeater-type cryptographic apparatus RE1 (IP subnet). If the terminal S1 exists in the same IP segment, the MAC address of the terminal S1 is acquired, for example, according to ARP and the S1 MAC address is set in MAC DA as in the connection form previously described with reference to FIG. 7. In the connection form in FIG. 10, the terminal S1 does not exist in the same IP segment as the repeater-type cryptographic apparatus RE1, thus the MAC address of PGW is acquired, for example, according to ARP and the PGW MAC address is set in MAC DA and a plaintext packet is prepared. The plaintext packet is transmitted to the plaintext network.

As the MAC address set in MAC SA, the MAC address of CGW may be set based on MAC SA (CGW) set in the received packet.

As described above, according to the embodiment, a ciphertext packet prepared by performing encapsulation processing of encrypting a plaintext packet received from the plaintext network and setting a new header in the plaintext packet is transmitted to the ciphertext network of the same IP subnet as the plaintext network and a plaintext packet prepared by performing decapsulation processing of decrypting a ciphertext packet received from the ciphertext network to a plaintext packet and again setting a header based on the address set in the heard of the plaintext packet is transmitted to the plaintext network of the same IP subnet as the ciphertext network, whereby encapsulation-type cryptographic apparatus can be easily installed without the need for the machines connected on the network to consider the presence of repeater-type cryptographic apparatus, namely, without changing setting of the network machines connected on the existing network, and it is made possible to construct a network security system adopting encapsulation-type cryptography.

According to the embodiment, a MAC header is set in a packet based on the IP header set in the encryption/encapsulation processing block or the decryption/decapsulation processing block, whereby an appropriate MAC header can be set in the packet and encapsulation-type cryptographic apparatus can be easily installed without changing setting of the network machines connected on the existing network.

According to the embodiment, repeater-type cryptographic apparatus comprises the terminal function block for processing a packet addressed to the home station, transmitted to the repeater-type cryptographic apparatus, so that data transmitted from another machine connected to the network can be received and processed; for example, a management packet for managing repeater-type cryptographic apparatus, etc., can be processed. Thus, the operation of the repeater-type cryptographic apparatus can be managed as another machine changes setting of cryptographic processing of the repeater-type cryptographic apparatus.

According to the embodiment, the cryptographic apparatus comprises the ciphertext output filter for determining the packet to be a discard packet which need not be transmitted from the ciphertext port, a transparent relay packet not processed and transparently relayed to the ciphertext network, or a ciphertext packet which needs to undergo encryption processing and discarding the packet if the packet is a discard packet, transmitting the packet to the ciphertext network if the packet is a transparent relay packet, or outputting the packet to the encryption/encapsulation processing block if the packet is a ciphertext packet, whereby various packets containing any other packet than the ciphertext packet received from the plaintext network or the terminal function block can be processed.

According to the embodiment, the cryptographic apparatus comprises the plaintext output filter for determining the packet to be a discard packet which need not be transmitted from the plaintext port, a transparent relay packet not processed and transparently relayed to the plaintext network, or a plaintext packet undergoing decryption/decapsulation processing by the decryption/decapsulation processing block and discarding the packet if the packet is a discard packet, transmitting the packet to the plaintext network if the packet is a transparent relay packet, or outputting the packet to the plaintext MAC address resolution block if the packet is a plaintext packet, whereby various packets containing any other packet than the plaintext packet received from the ciphertext network or the terminal function block can be processed.

According to the embodiment, the cryptographic apparatus comprises the home station output filter for determining whether the packet is a packet addressed to the home station, which needs to be sent to the terminal function block from the home station port or a discard packet which need not to be sent and transmitting the packet to the terminal function block if the packet is a packet addressed to the home station or discarding the packet if the packet is a discard packet, whereby various packets containing any other packet than the packet addressed to the home station received from the ciphertext network or the plaintext network can be processed.

In the description of the embodiment, one repeater-type cryptographic apparatus comprises the encryption/encapsulation processing section made up of the encryption/encapsulation processing block and the ciphertext MAC address resolution block and the decryption/decapsulation processing section made up of the decryption/decapsulation processing block and the plaintext MAC address resolution block. However, the encryption/encapsulation processing section and the decryption/decapsulation processing section may be provided as a separate encryptor and decryptor; a similar advantage can be provided.

Figure 11:
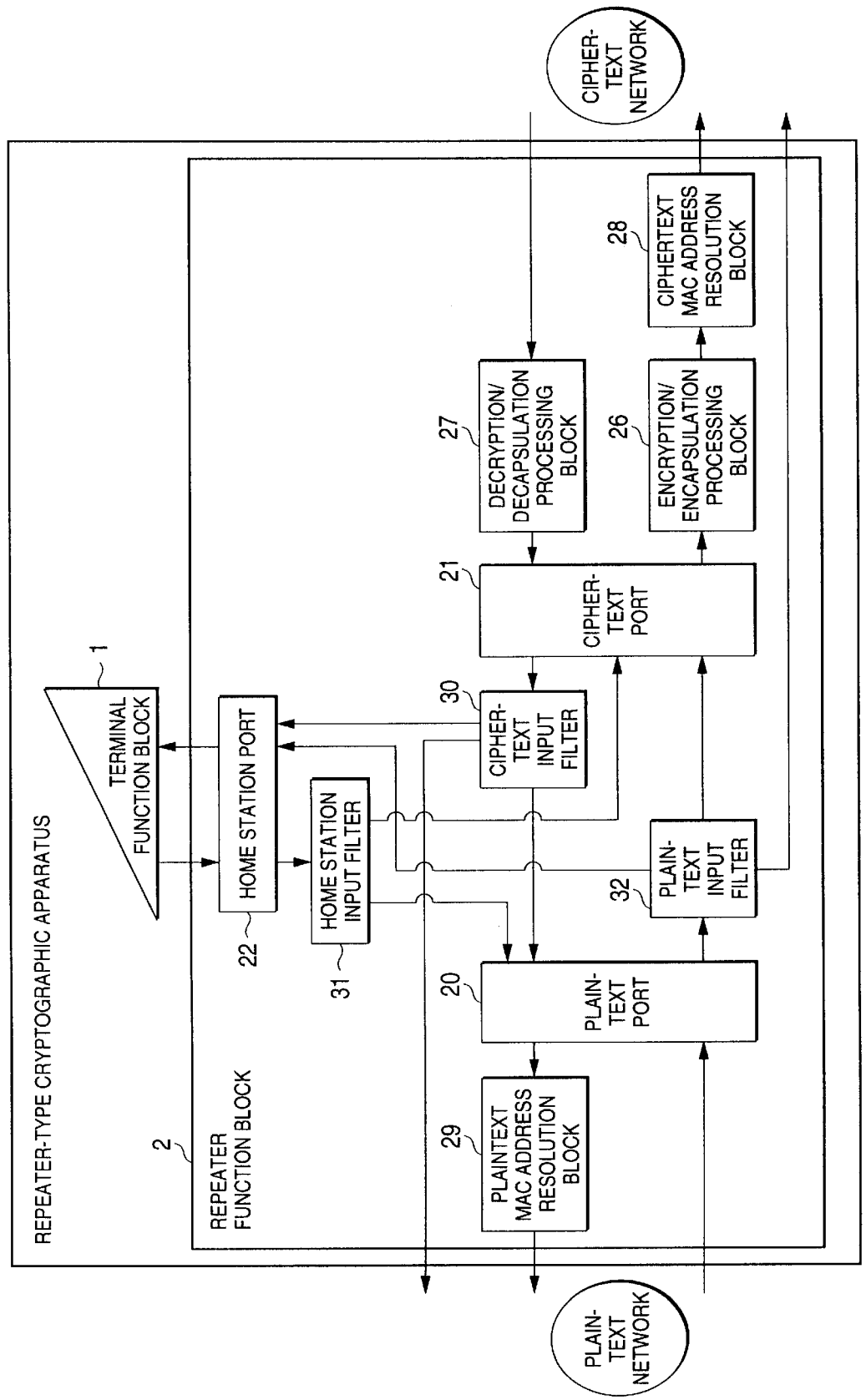
FIG. 11 is a block diagram to show another configuration of a cryptographic apparatus of the first embodiment of the invention.
Figure 12:
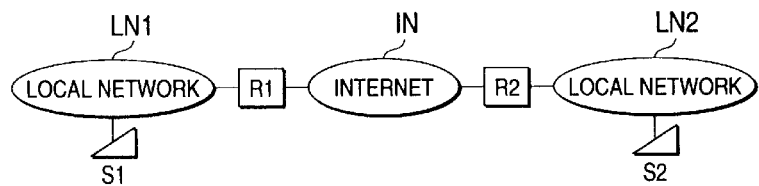
FIG. 12 is a block diagram to show a general network configuration in a related art.
Figure 13:
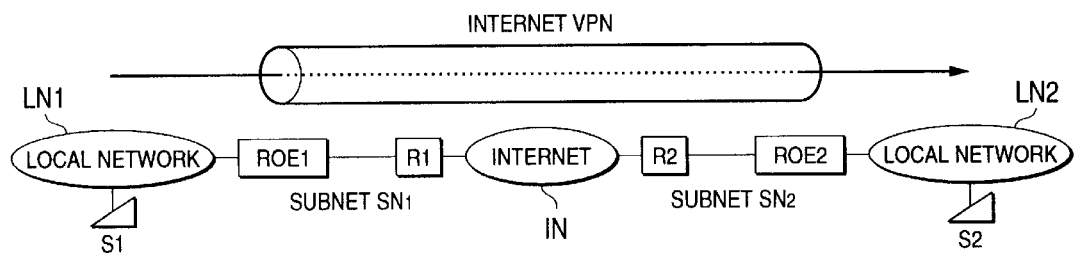
FIG. 13 is a block diagram to show the network configuration wherein router-type cryptographic apparatus in a related art are installed.
Figure 14:
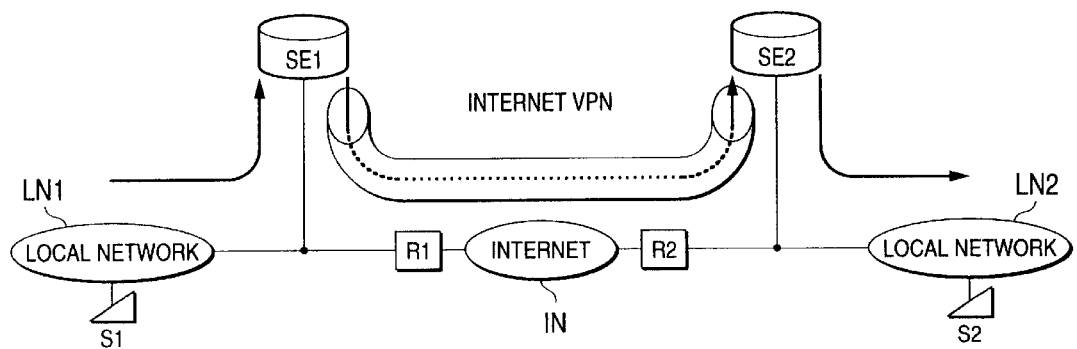
FIG. 14 is a block diagram to show the network configuration wherein terminal-type cryptographic apparatus are installed.

In the description of the embodiment, the repeater-type cryptographic apparatus is provided with the output filters from the ports for filtering the outputs of the ports, as shown in FIG. 1. However, if the repeater-type cryptographic apparatus is provided with input filters from the ports for filtering the inputs of the ports so as to transfer an input packet only to the ports to which the input packet needs to be transmitted, as shown in FIG. 11, a similar advantage can be provided.

In this case, a ciphertext input filter 30 consists of a plaintext filter for determining ciphertext data received from the ciphertext network to be transparent relay information, discard information, or plaintext information based on the decrypting result of the decryption/decapsulation processing block and allowing the ciphertext data to be transmitted to the plaintext network if the ciphertext data is transparent relay information, discarding the ciphertext data if the ciphertext data is discard information, or outputting plaintext data provided by the decryption/decapsulation processing section to the plaintext MAC address resolution block if the ciphertext data is plaintext information, and a ciphertext home station filter for determining whether the ciphertext data received from the ciphertext network is information addressed to the home station or discard information and outputting the ciphertext data to the terminal function block if the ciphertext data is information addressed to the home station or discarding the ciphertext data if the ciphertext data is discard information.

A home station input filter 31 consists of a home station plaintext filter for determining whether or not the home station output information output from the terminal function block is transparent relay information to the plaintext network and allowing the home station output information to be transmitted to the plaintext network if the home station output information is transparent relay information to the plaintext network, a home station ciphertext filter for determining whether or not the home station output information output from the terminal function block is ciphertext information to the ciphertext network and outputting the home station output information to the decryption/decapsulation processing section if the home station output information is ciphertext information to the ciphertext network, and a home station discard filter for determining whether or not the home station output information output from the terminal function block is discard information and discarding the home station output information if the home station output information is discard information. In FIG. 11, the home station input filter 31 and the plaintext port 25 are connected and it is made possible to transmit from the home station input filter 31 to the ciphertext network, whereby various packets can be processed.

A plaintext input filter 32 consists of a ciphertext filter for determining plaintext data received from the plaintext network to be transparent relay information, discard information, or ciphertext information and allowing the plaintext data to be transmitted to the ciphertext network if the plaintext data is transparent relay information, discarding the plaintext data if the plaintext data is discard information, or outputting the plaintext data to the decryption/decapsulation processing section if the plaintext data is ciphertext information, and a plaintext home station filter for determining whether the plaintext data received from the plaintext network is information addressed to the home station or discard information and outputting the plaintext data to the terminal function block if the plaintext data is information addressed to the home station or discarding the plaintext data if the plaintext data is discard information.

As described above, according to one aspect of the invention, there is provided a cryptographic apparatus for relaying data between a plaintext network and a ciphertext network, the cryptographic apparatus comprising an encryption/encapsulation processing section for encrypting plaintext data received from the plaintext network, determining a cryptographic apparatus corresponding to the address set in the header of the plaintext data based on the predetermined correspondence between addresses and different cryptographic apparatus, setting a new header based on the determined cryptographic apparatus as encapsulation processing, and transmitting ciphertext data provided thereby to the ciphertext network of the same IP (Internet Protocol) subnet as the plaintext network, and a decryption/decapsulation processing section for decrypting ciphertext data received from the ciphertext network into plaintext data, again setting a header based on the address set in the header of the plaintext data as decapsulation processing, and transmitting plaintext data provided thereby to the plaintext network of the same IP subnet as the ciphertext network. Thus, the header of the relayed data is set and the data with the header is transmitted to the network of the same IP subnet, so that encapsulation-type cryptographic apparatus can be easily installed without the need for the machines connected on the network to consider the presence of the cryptographic apparatus, namely, without changing setting of the network machines connected to the existing network like a repeater, and it is made possible to construct a network security system adopting encapsulation-type cryptography.

In the cryptographic apparatus according to the invention, the encryption/encapsulation processing section comprises an encryption/encapsulation processing block for encrypting plaintext data received from the plaintext network and determining the cryptographic apparatus corresponding to the address set in the IP (Internet Protocol) header of the plaintext data based on the predetermined correspondence between addresses and different cryptographic apparatus, and setting a new IP header based on the determined cryptographic apparatus as encapsulation processing, and a ciphertext MAC address resolution block for setting a MAC header based on the IP header set in the encryption/encapsulation processing block, preparing ciphertext data, and transmitting the prepared ciphertext data to the ciphertext network of the same IP subnet as the plaintext network, and the decryption/decapsulation processing section comprises a decryption/decapsulation processing block for decrypting ciphertext data received from the ciphertext network into plaintext data and again setting an IP header based on the address set in the IP header of the plaintext data as decapsulation processing, and a plaintext MAC address resolution block for setting a MAC header based on the IP header again set in the decryption/decapsulation processing block, preparing plaintext data, and transmitting the prepared plaintext data to the plaintext network of the same IP subnet as the ciphertext network. Thus, an appropriate MAC address can be set in the relayed data and encapsulation-type cryptographic apparatus can be easily installed without changing setting of the network machines connected to the existing network like a repeater.

The cryptographic apparatus according to the invention further includes a plaintext filter for determining the ciphertext data received from the ciphertext network to be transparent relay information, discard information, or plaintext information based on the decryption result of the decryption/decapsulation processing block and allowing the ciphertext data to be transmitted to the plaintext network if the ciphertext data is transparent relay information, discarding the ciphertext data if the ciphertext data is discard information, or outputting plaintext data decrypted by the decryption/decapsulation processing block to the plaintext MAC address resolution block if the ciphertext data is plaintext information, wherein the plaintext MAC address resolution block sets a MAC header in the plaintext data output from the plaintext filter and transmits the plaintext data to the plaintext network. Thus, various data containing any other data than the plaintext data received from the ciphertext network and transmitted as plaintext data can be processed The cryptographic apparatus according to the invention further includes a ciphertext filter for determining the plaintext data received from the plaintext network to be transparent relay information, discard information, or ciphertext information and allowing the plaintext data to be transmitted to the ciphertext network if the plaintext data is transparent relay information, discarding the plaintext data if the plaintext data is discard information, or outputting the plaintext data to the decryption/decapsulation processing section if the plaintext data is ciphertext information, wherein the encryption/encapsulation processing section prepares ciphertext data from the plaintext data output from the ciphertext filter and transmits the ciphertext data to the ciphertext network. Thus, various data containing any other data than the ciphertext data received from the plaintext network and transmitted as ciphertext data can be processed.

The cryptographic apparatus according to the invention further includes a terminal function block for processing information addressed to the home station, transmitted to the home station, a plaintext home station filter for determining whether the plaintext data received from the plaintext network is information addressed to the home station or discard information and outputting the plaintext data to the terminal function block if the plaintext data is information addressed to the home station or discarding the plaintext data or ciphertext data if the plaintext data is discard information, a ciphertext home station filter for determining whether the ciphertext data received from the ciphertext network is information addressed to the home station or discard information and outputting the ciphertext data to the terminal function block if the ciphertext data is information addressed to the home station or discarding the ciphertext data if the ciphertext data is discard information, a home station plaintext filter for determining whether or not home station output information output from the terminal function block is transparent relay information to the plaintext network and allowing the home station output information to be transmitted to the plaintext network if the home station output information is transparent relay information to the plaintext network, a home station ciphertext filter for determining whether or not the home station output information output from the terminal function block is ciphertext information to the ciphertext network and outputting the home station output information to the decryption/decapsulation processing section if the home station output information is ciphertext information to the ciphertext network, and a home station discard filter for determining whether or not the home station output information output from the terminal function block is discard information and discarding the home station output information if the home station output information is discard information. Thus, data transmitted from another machine connected to the network can be received and processed; for example, a management packet for managing cryptographic apparatus, etc., can be processed. Thus, the operation of the cryptographic apparatus can be managed as another machine changes setting of cryptographic processing of the cryptographic apparatus.

According to another aspect of the invention, there is provided an encryptor for relaying data between a plaintext network and a ciphertext network, the encryptor comprising an encryption/encapsulation processing section for encrypting plaintext data received from the plaintext network, determining a cryptographic apparatus corresponding to the address set in the header of the plaintext data based on the predetermined correspondence between addresses and different cryptographic apparatus, setting a new header based on the determined cryptographic apparatus as encapsulation processing, and transmitting ciphertext data provided thereby to the ciphertext network of the same IP subnet as the plaintext network. Thus, the header of the relayed data is set and the data with the header is transmitted to the ciphertext network of the same IP subnet, so that encapsulation-type cryptographic apparatus can be easily installed without the need for the machines connected on the network to consider the presence of the cryptographic apparatus, namely, without changing setting of the network machines connected to the existing network like a repeater, and it is made possible to construct a network security system adopting encapsulation-type cryptography.

According to another aspect of the invention, there is provided a decryptor for relaying data between a plaintext network and a ciphertext network, the decryptor comprising a decryption/decapsulation processing section for decrypting ciphertext data received from the ciphertext network into plaintext data, again setting a header based on the address set in the header of the plaintext data as decapsulation processing, and transmitting plaintext data provided thereby to the plaintext network of the same IP subnet as the ciphertext network. Thus, the header of the relayed data is set and the data with the header is transmitted to the plaintext network of the same IP subnet, so that encapsulation-type cryptographic apparatus can be easily installed without the need for the machines connected on the network to consider the presence of the cryptographic apparatus, namely, without changing setting of the network machines connected to the existing network like a repeater, and it is made possible to construct a network security system adopting encapsulation-type cryptography.

What is claimed is:

1. A cryptographic apparatus for relaying data between a plaintext network and a ciphertext network, the cryptographic apparatus comprising:

an encryption/encapsulation processing section for encrypting plaintext data received from the plaintext network, determining a different cryptographic apparatus corresponding to an address set in a first header of the plaintext data based on a predetermined correspondence between the address and the different cryptographic apparatus, setting a second header corresponding to the different cryptographic apparatus as encapsulation processing to generate ciphertext, and transmitting the ciphertext data to the ciphertext network of the same IP (Internet Protocol) subnet as the plaintext network;

a decryption/decapsulation processing section for decrypting the ciphertext data received from the ciphertext network into the plaintext data, setting a third header based on the address set in the first header of the plaintext data as decapsulation processing, and transmitting the plaintext data to the plaintext network of the same IP subnet as the ciphertext network;

wherein the encryption/encapsulation processing section comprises:

an encryption/encapsulation processing block for encrypting the plaintext data received from the plaintext network and determining the different cryptographic apparatus corresponding to the address set in a first IP (Internet Protocol) header of the plaintext data based on the predetermined correspondence between the address and the different cryptographic apparatus, and setting a second IP header based on the different cryptographic apparatus as encapsulation processing; and a ciphertext MAC (Media Access Control) address resolution block for setting a first MAC header based on the second IP header set in the encryption/encapsulation processing block, preparing the ciphertext data, and transmitting the ciphertext data to the ciphertext network of the same IP subnet as the plaintext network, and wherein the decryption/decapsulation processing section comprises:

a decryption/decapsulation processing block for decrypting the ciphertext data received from the ciphertext network into plaintext data and setting the first IP header based on the address set in the first IP header of the plaintext data as decapsulation processing; and a plaintext MAC address resolution block for setting a second MAC header based on the first IP header again set in the decryption/decapsulation processing block, preparing plaintext data, and transmitting the plaintext data to the plaintext network of the same IP subnet as the ciphertext network.

2. A cryptographic apparatus for relaying data between a plaintext network and a ciphertext network, the cryptographic apparatus comprising:

an encryption/encapsulation processing section for encrypting plaintext data received from the plaintext network, determining a different cryptographic apparatus corresponding to an address set in a first header of the plaintext data based on a predetermined correspondence between the address and the different cryptographic apparatus, setting a second header corresponding to the different cryptographic apparatus as encapsulation processing to generate ciphertext, and transmitting the ciphertext data to the ciphertext network of the same IP (Internet Protocol) subnet as the plaintext network;

a decryption/decapsulation processing section for decrypting the ciphertext data received from the ciphertext network into the plaintext data, setting a third header based on the address set in the first header of the plaintext data as decapsulation processing, and transmitting the plaintext data to the plaintext network of the same IP subnet as the ciphertext network;

wherein the encryption/encapsulation processing section includes an encryption/encapsulation processing block for encrypting the plaintext data received from the plaintext network and determining the different cryptographic apparatus corresponding to the address set in a first IP (Internet Protocol) header of the plaintext data based on the predetermined correspondence between the address and the different cryptographic apparatus, and setting a second IP header based on the different cryptographic apparatus as encapsulation processing;

a ciphertext MAC (Media Access Control) address resolution block for setting a first MAC header based on the second IP header set in the encryption/encapsulation processing block, preparing the ciphertext data, and transmitting the ciphertext data to the ciphertext network of the same IP subnet as the plaintext network, and wherein the decryption/decapsulation processing section comprises:

a decryption/decapsulation processing block for decrypting the ciphertext data received from the ciphertext network into plaintext data and setting the first IP header based on the address set in the first IP header of the plaintext data as decapsulation processing; and a plaintext MAC address resolution block for setting a second MAC header based on the first IP header again set in the decryption/decapsulation processing block, preparing plaintext data, and transmitting the plaintext data to the plaintext network of the same IP subnet as the ciphertext network;

a plaintext filer for determining the ciphertext data received from the ciphertext network to be transparent relay information, discard information, or plaintext information based on the decryption result of the decryption/decapsulation processing block and allowing the ciphertext data to be transmitted to the plaintext network if the ciphertext is transparent relay information, discarding the ciphertext data if the ciphertext data is discard information, or outputting plaintext data decrypted by the decryption/decapsulation processing block to the plaintext MAC address resolution block if the ciphertext data is plaintext information; and wherein the plaintext MAC address resolution block sets the second MAC header in the plaintext data output from the plaintext filter and transmits the plaintext data to the plaintext network.

3. A cryptographic apparatus for relaying data between a plaintext network and a ciphertext network, the cryptographic apparatus comprising:

an encryption/encapsulation processing section for encrypting plaintext data received from the plaintext network, determining a different cryptographic apparatus corresponding to an address set in a first header of the plaintext data based on a predetermined correspondence between the address and the different cryptographic apparatus, setting a second header corresponding to the different cryptographic apparatus as encapsulation processing to generate ciphertext, and transmitting the ciphertext data to the ciphertext network of the same IP (Internet Protocol) subnet as the plaintext network;

a decryption/decapsulation processing section for decrypting the ciphertext data received from the ciphertext network into the plaintext data, setting a third header based on the address set in the first header of the plaintext data as decapsulation processing, and transmitting the plaintext data to the plaintext network of the same IP subnet as the ciphertext network;

a ciphertext filter for determining the plaintext data received from the plaintext network to be transparent relay information, discard information, or ciphertext information and allowing the plaintext data to be transmitted to the ciphertext network if the plaintext data is transparent delay information, discarding the plaintext data if the plaintext data is discard information, or outputting the plaintext data to the decryption/decapsulation processing section if the plaintext data is ciphertext information; and wherein the encryption/encapsulation processing section prepares the ciphertext data from the plaintext data output from the ciphertext filter and transmits the ciphertext data to the ciphertext network.

4. A cryptographic apparatus for relaying data between a plaintext network and a ciphertext network, the cryptographic apparatus comprising:

an encryption/encapsulation processing section for encrypting plaintext data received from the plaintext network, determining a different cryptographic apparatus corresponding to an address set in a first header of the plaintext data based on a predetermined correspondence between the address and the different cryptographic apparatus, setting a second header corresponding to the different cryptographic apparatus as encapsulation processing to generate ciphertext, and transmitting the ciphertext data to the ciphertext network of the same IP (Internet Protocol) subnet as the plaintext network;

a decryption/decapsulation processing section for decrypting the ciphertext data received from the ciphertext network into the plaintext data, setting a third header based on the address set in the first header of the plaintext data as decapsulation processing, and transmitting the plaintext data to the plaintext network of the same IP subnet as the ciphertext network;

a terminal function block for processing information addressed to the home station, transmitted to the home station;

a plaintext home station filter for determining whether the plaintext data received from the plaintext network is information addressed to the home station or discard information and outputting the plaintext data to the terminal function block if the plaintext data is information addressed to the home station or discarding the plaintext data or ciphertext data if the plaintext data is discard information;

a ciphertext home station filter for determining whether the ciphertext data received from the ciphertext network is information addressed to the home station or discard information and outputting the ciphertext data to the terminal function block if the ciphertext data is information addressed to the home station or discarding the ciphertext data if the ciphertext data is discard information;

a home station plaintext filter for determining whether or not home station output information output from the terminal function block is transparent relay information to the plaintext network and allowing the home station output information to be transmitted to the plaintext network to the plaintext network if the home station output information is transparent relay information to the plaintext network;

a home station ciphertext filter for determining whether or not the home station output information output from the terminal function block is ciphertext information to the ciphertext network and outputting the home station output information to the decryption/decapsulation processing section if the home station output information is ciphertext information to the ciphertext network; and a home station discard filter for determining whether or not the home station output information output from the terminal function block is discard information and discarding the home station output information if the home station output information is discard information.

* * * * *